United States Patent
Uetsuka et al.

(10) Patent No.: US 6,556,749 B2
(45) Date of Patent: Apr. 29, 2003

(54) ARRAY WAVEGUIDE GRATING AND METHOD OF MANUFACTURE THEREOF

(75) Inventors: Hisato Uetsuka, Hitachi (JP); Masahiro Okawa, Hitachi (JP); Koichi Maru, Hitachi (JP); Takafumi Chiba, Hitachi (JP)

(73) Assignee: Hitachi Cable Limited, Tokyo (JP)

( * ) Notice: Subject to any disclaimer, the term of this patent is extended or adjusted under 35 U.S.C. 154(b) by 62 days.

(21) Appl. No.: 09/890,625

(22) PCT Filed: Dec. 8, 2000

(86) PCT No.: PCT/JP00/08715
§ 371 (c)(1),
(2), (4) Date: Aug. 2, 2001

(87) PCT Pub. No.: WO01/42833
PCT Pub. Date: Jun. 14, 2001

(65) Prior Publication Data
US 2003/0007728 A1 Jan. 9, 2003

(30) Foreign Application Priority Data
Dec. 9, 1999 (JP) ............................................ 11-350257

(51) Int. Cl.$^7$ .................................................. G02B 6/34
(52) U.S. Cl. ........................................... 385/37; 385/47
(58) Field of Search ............................. 385/14, 24, 37, 385/45, 46, 47, 130, 131, 132; 359/115, 124, 134, 337.22, 341.1, 341.3

(56) References Cited

U.S. PATENT DOCUMENTS

| | | | |
|---|---|---|---|
| 5,450,511 A | 9/1995 | Dragone | 385/37 |
| 5,917,625 A * | 6/1999 | Ogusu et al. | 359/130 |
| 6,055,349 A | 4/2000 | Seino et al. | 385/50 |
| 6,069,990 A | 5/2000 | Okawa et al. | 385/43 |
| 6,229,938 B1 * | 5/2001 | Hibino et al. | 385/24 |
| 6,434,303 B1 * | 8/2002 | Temkin et al. | 385/43 |

FOREIGN PATENT DOCUMENTS

JP    11-160555    6/1999    ............ G02B/6/12

OTHER PUBLICATIONS

C. K. Madsen, "General IIR Optical Filter Design for WDM Applications Using All Pass Filters", Journal of Lightwave Technology, vol. 18, No. 6, Jun. 2000.

"Flattening of the wavelength response of Michelson type Multi/Demultiplexers with a Fabry–Perot Resonator" Proceedings of the 1999 Electronics Society Conference of IEICE, Sep. 7–10, 1999, 4 pages.

* cited by examiner

Primary Examiner—Robert H. Kim
Assistant Examiner—Michael H Caley
(74) Attorney, Agent, or Firm—McCormick, Paulding & Huber LLP

(57) ABSTRACT

The present invention relates to an array waveguide grating and a method of manufacture thereof, in which a substantially smooth wavelength-loss characteristics is obtained in a pass band, rather than increasing the loss. In an array waveguide grating (10), wavelength multiplex division signal light is demultiplexed by a channel waveguide array (15), reflected by a Fabry-Perot resonator array (16), and passed through the channel waveguide array (15) again, so that a substantially smooth wavelength-loss characteristic is obtained in the pass band, rather than increasing the loss.

34 Claims, 7 Drawing Sheets

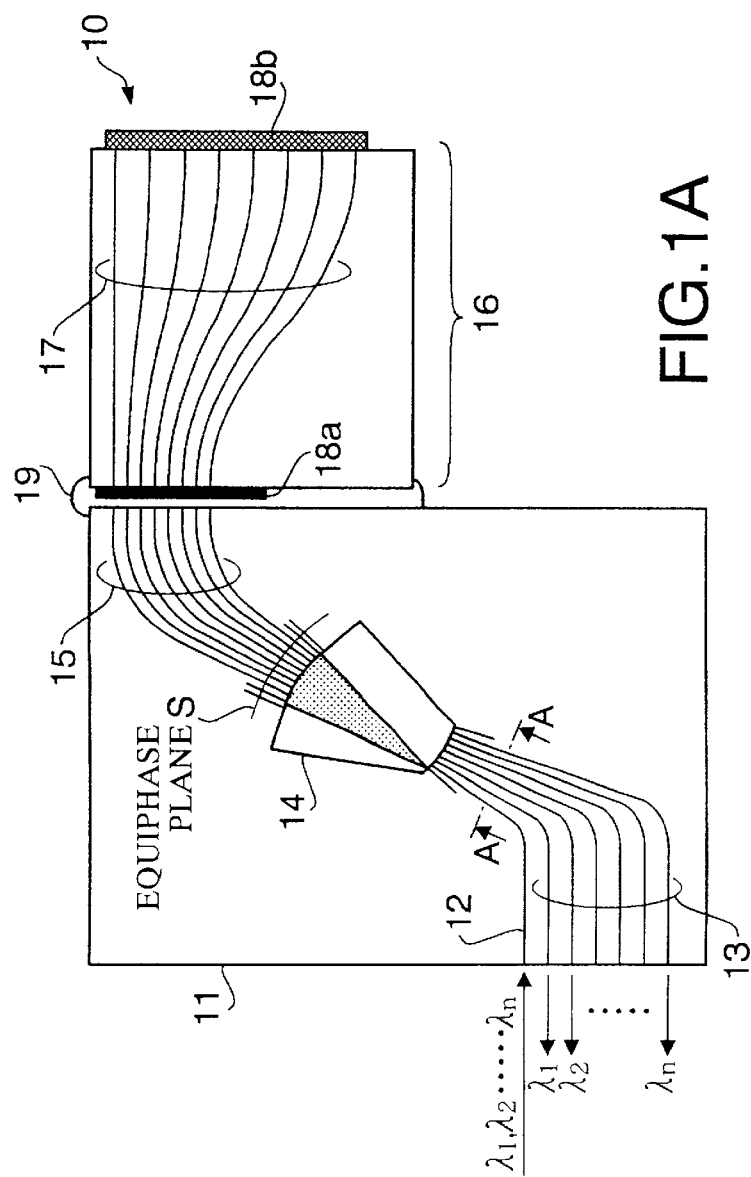
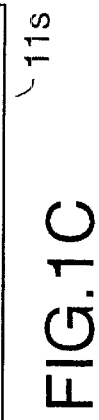
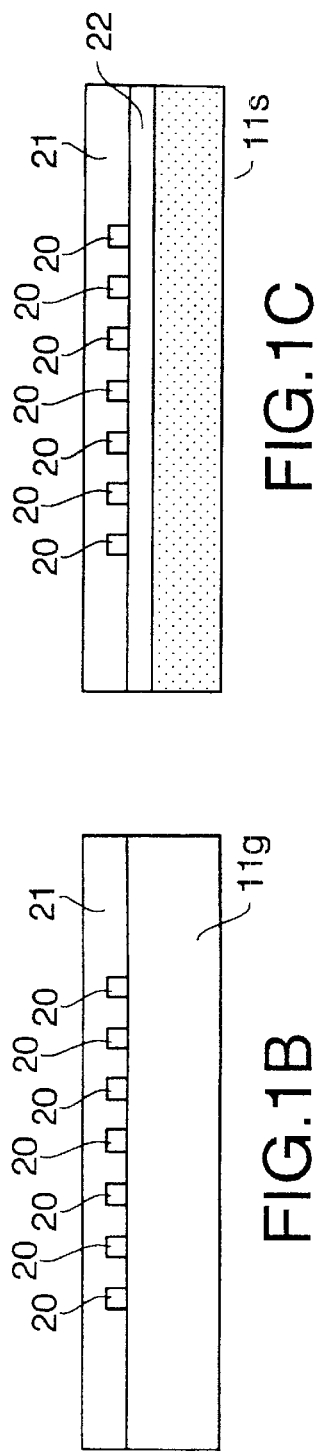
FIG.1A
FIG.1B
FIG.1C

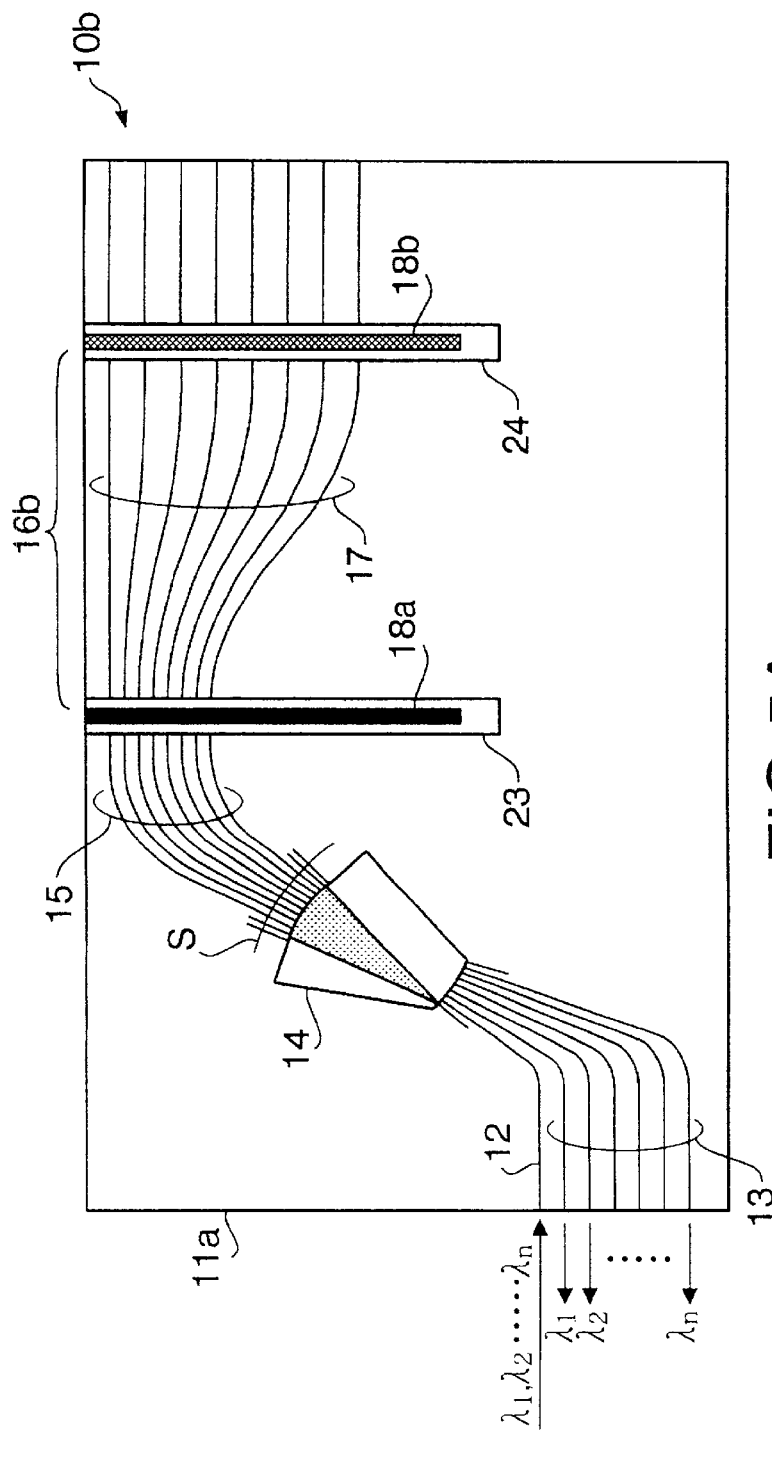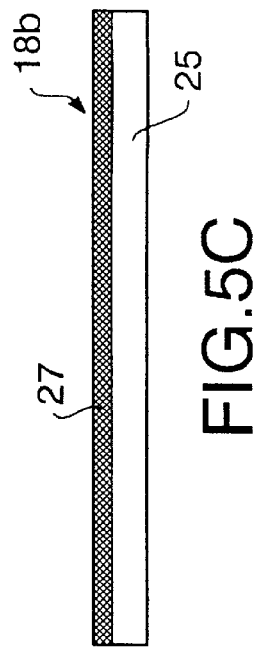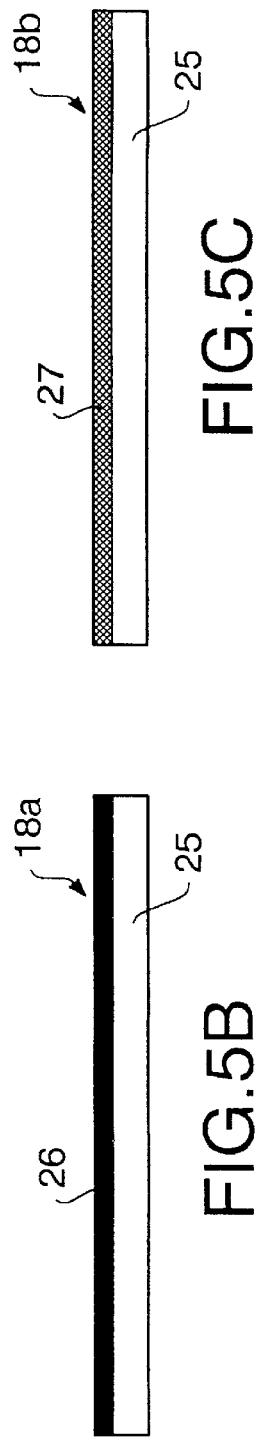

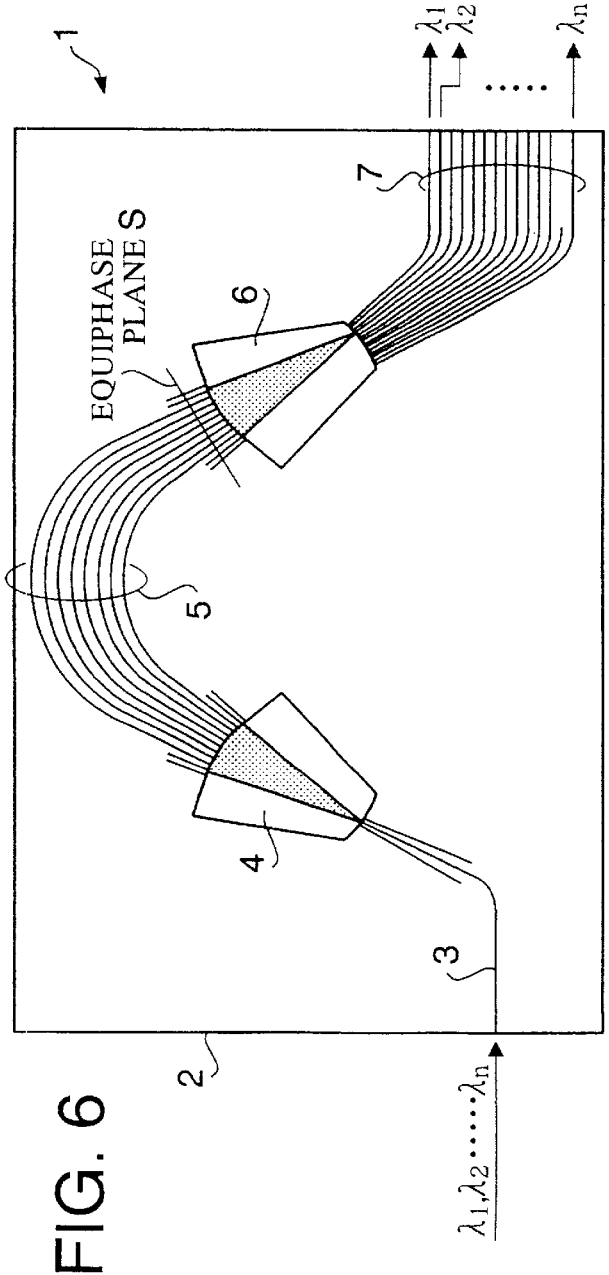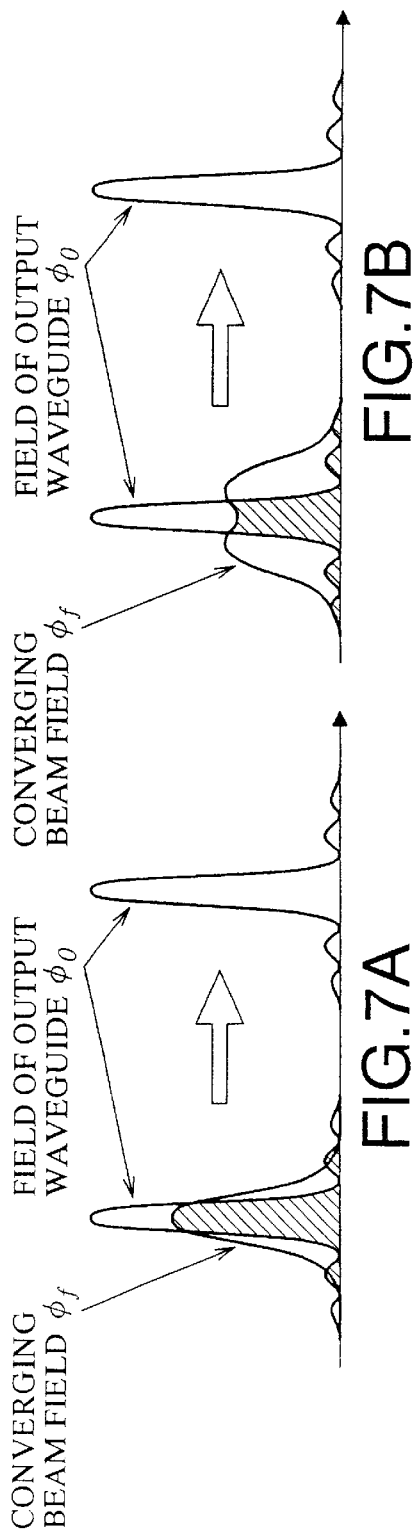

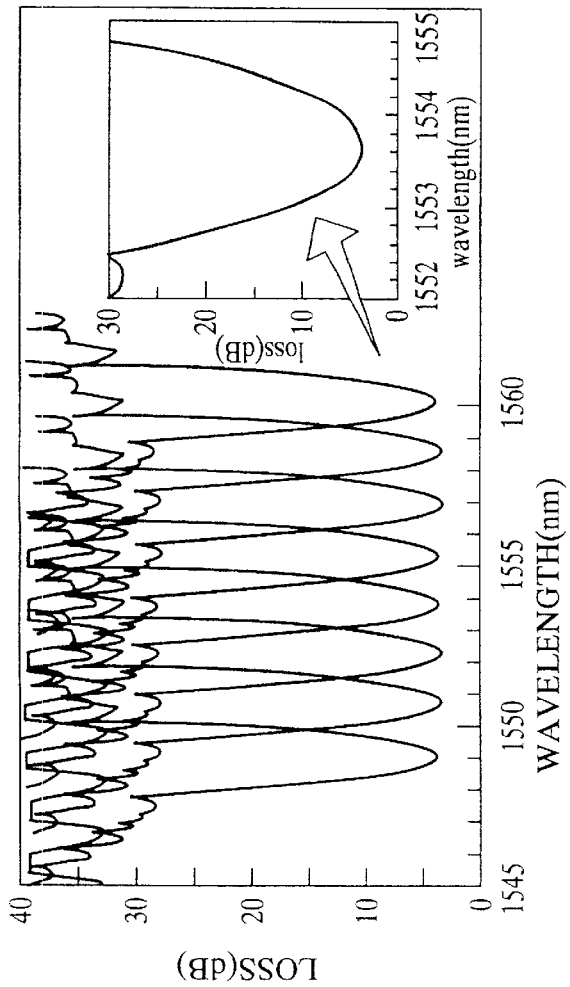
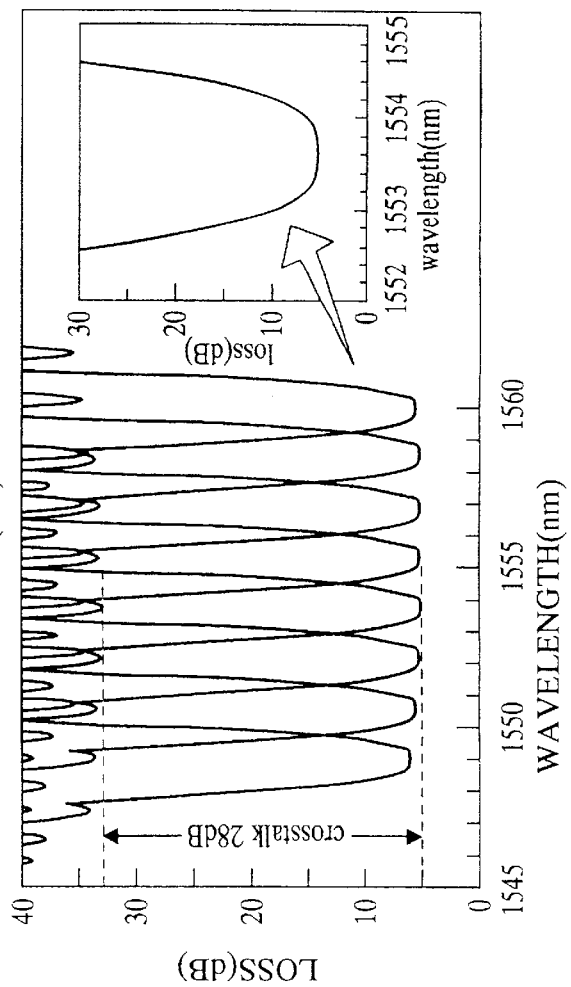
FIG.8A
FIG.8B

ARRAY WAVEGUIDE GRATING AND METHOD OF MANUFACTURE THEREOF

BACKGROUND OF THE INVENTION

1. Field of the Invention

The present invention relates to an array waveguide grating and a manufacturing method of the same.

2. Description of the Related Art

FIG. 6 of the accompanying drawings is a plan view showing an example of conventional array waveguide gratings.

The array waveguide grating 1 shown in this figure is includes a substrate 2, an input channel waveguide 3 formed on top of the substrate 2 for accepting wavelength-multiplexed signal light at one end thereof (in the figure, the left end), an input-side fan-shaped slab waveguide 4 connected to the input channel waveguide 3 at one end thereof, an array of a plurality of channel waveguides 5, one end of which array is connected to the other end (in the figure, the right end) of the input-side fan-shaped slab waveguide 4 such that lengths of the channel waveguides 5 become successively longer by a desired variation, an output-side fan-shaped slab waveguide 6, one end of which is connected to the other ends of the array channel waveguides 5, and a plurality of output channel waveguides 7, each of which has one end connected to the other end of the output side fan-shaped slab waveguide 6 for outputting signal lights which have been split.

Signal light of various wavelengths ($\lambda 1, \lambda 2, \ldots, \lambda n$) introduced to the input channel waveguide 3 is spread out in the input-side slab waveguide 4 by diffraction because it is not trapped in the transverse direction (surface direction of the substrate 2) in the input-side fan-shaped slab waveguide 4, and is propagated along the array of channel waveguides 5. In this array 5, the channel waveguides extend different lengths (successively elongated by a desired length) so that equiphase planes of the signal light are inclined in accordance with the wavelengths of the signal light. Thus, the points of convergence of the signal light shift at the connecting face between the output-side fan-shaped slab waveguide 6 and the output channel waveguides 7.

Therefore, the signal light of different wavelengths is incident on the output channel waveguides 7 respectively, and the signal light of different wavelengths ($\lambda 1, \lambda 2, \ldots, \lambda n$) is outputted from the output ends of the output channel waveguides 7 respectively.

FIGS. 7A and 7B are diagrams showing the relationship between converging beam fields of the output-side fan-shaped slab waveguide and fields of the output channel waveguides of the array waveguide grating shown in FIG. 6. FIGS. 8A and 8B are diagrams of wavelength-loss characteristics of the array waveguide grating 1 shown in FIG. 6, in which the horizontal axis indicates wavelength and the vertical axis indicates loss.

The loss of the array waveguide grating 1 is proportional to the overlap integral (hatched portion) of the electric field distribution $\phi f$ of the converging beam and the electric field distribution $\phi o$ of the output waveguides as shown in FIGS. 7A and 7B. Because the electric field of the output channel waveguide 7 has a single-peaked distribution, the loss is lowest at the wavelength that matches the peak of the converging beam $\phi f$, making for a peaky wavelength-loss characteristic (FIG. 8A).

Accordingly, a waveguide structure that uses Y-branching or a parabolic shape is employed such that the electric field distribution of the input channel waveguide 3 (or the output channel waveguide 7) has a dual-peaked shape as shown in FIG. 7B. In this case, even if the points of convergence of the beams shift to a certain extent, the value of the overlap integral hardly changes, making for a flat wavelength-loss characteristic (FIG. 8B).

FIG. 9 is an enlarged view of part of the wavelength-loss characteristic of the array waveguide grating shown in FIG. 6. The horizontal axis indicates the wavelength, and the vertical axis indicates the loss.

When the electric field distribution of the output waveguide (or the input waveguide) has a dual-peaked shape, it is difficult to achieve total flatness in the wavelength-loss characteristics distribution. Further, 2 to 3 dB of additional loss is generated to realize the flatness. When application in a wavelength-multiplexed optical telecommunications system is considered, this loss increase is a problem and loss improvement must be made. When a yet flatter wavelength-loss characteristics is sought in this structure, another problem arises; a ripple appears in the transmission region as shown in FIG. 9, greatly affecting transmission characteristics.

Accordingly, an object of the present invention is to provide an array waveguide grating, which solves the above-mentioned problems, and which has approximately flat wavelength-loss characteristics in the transmission region without causing an increase in loss, and a manufacturing method of the array waveguide grating.

SUMMARY OF THE INVENTION

An array waveguide grating of the present invention comprises a substrate, an input channel waveguide formed on top of the substrate for receiving wavelength-multiplexed signal light at one end thereof; a plurality of output channel waveguides disposed parallel to the input channel waveguide for outputting split output signal light from respective one ends thereof; a fan-shaped slab waveguide connected to the other end of the input channel waveguide at one end thereof and to the other ends of the output channel waveguides at the same one end thereof, an array of a plurality of channel waveguides connected to the other end of the fan-shaped slab waveguide at one end thereof such that lengths of the channel waveguides are successively elongated by a desired variation $\Delta L$, and an array of Fabry-Perot resonators connected to the other end of the array of channel waveguides at one end thereof such that lengths of the resonators are successively elongated by twice the channel waveguide length variation $\Delta L$.

The signal light obtained by splitting the wavelength-multiplexed signal light in the array of channel waveguides is reflected inside the Fabry-Perot resonators, and this split signal light is caused to pass through the array of channel waveguides once again. Therefore, the array waveguide grating provided by the invention has approximately flat wavelength-loss characteristics in the transmission region without increasing loss.

Preferably a reflectance of the Fabry-Perot resonator array at its face connecting with the channel waveguide array is approximately 11%, and a reflectance at its face opposite the connecting face is approximately 100% (full reflection).

The face of the Fabry-Perot resonator array in contact with the channel waveguide array may be coated with a metallic film having a reflectance of approximately 11%, and the opposite face may be coated with either a metallic film having a reflectance of approximately 100%, or a multilayer dielectric film of $TiO_2$ and $SiO_2$ having a reflectance of approximately 100%.

The Fabry-Perot resonator array may be constituted from an array of semicircular concentric channel waveguides, respective one ends of which are connected to the other ends of the array channel waveguides such that lengths of the semicircular concentric channel waveguides become successively longer by twice the waveguide length variation ΔL, a reflective film formed between the channel waveguide array and semicircular channel waveguide array and having a reflectance of approximately 11%, and another reflective film formed at the other end of the semicircular channel waveguide array and having a reflectance of approximately 100%.

Alternatively the Fabry-Perot resonator array may be constituted from a second array of channel waveguides, respective one ends of which are connected to the other ends of the first array of channel waveguides such that lengths of the second channel waveguides are successively elongated by twice the first waveguide length variation ΔL, a first groove transversely crossing the first and second channel waveguide arrays at the connecting portion of these arrays, a reflective film fitted in the first groove and having a reflectance of approximately 11%, a second groove transversely extending across the second channel waveguide array midway, and another reflective film fitted in the second groove and having a reflectance of approximately 100%.

The reflective film of the array waveguide grating may be formed by vapor deposition of a metallic film of silicon, gold or similar, on top of a thin film of polyimide.

In the array waveguide grating, preferably the polyimide reflective film, on which the metallic film has been deposited by vapor deposition, is affixed using optical resin.

In the array waveguide grating, preferably the channel waveguides are formed either on top of a quartz substrate or a silicon substrate, and constituted by a material having quartz glass as a principal constituent.

Preferably the channel waveguides are primarily made from InP.

A method of manufacturing an array waveguide grating according to the present invention includes the steps of forming, in parallel on top of a substrate, an input channel waveguide adapted to receive wavelength-multiplexed signal light at one end thereof, and a plurality of output channel waveguides adapted to output split output signal light from one end thereof forming a fan-shaped slab waveguide on the same substrate such that one end thereof is connected to the other end of the input channel waveguide and the other ends of the output channel waveguides; forming at the other end of the fan-shaped slab waveguide on the same substrate an array of a plurality of channel waveguides, which becomes successively longer by a desired waveguide length variation ΔL; forming, on top of a second substrate, an array of Fabry-Perot resonators which become successively longer by twice the waveguide length variation ΔL; and connecting the first substrate to the second substrate such that one end of the Fabry-Perot resonator array connects to the other end of the channel waveguide array.

In the manufacturing method for the array waveguide grating according to the present invention, the Fabry-Perot resonator array may be constituted from an array of semicircular concentric channel waveguides formed on top of the second substrate such that lengths of the semicircular concentric channel waveguides become successively longer by twice the waveguide length variation ΔL, a reflective film formed at one end of the array of semicircular concentric channel waveguides and having a reflectance of approximately 11%, and another reflective film formed at the other end of the array of semicircular concentric channel waveguides and having a reflectance of approximately 100%, and the first substrate may be connected to the second substrate such that the reflective film having a reflectance of approximately 11% is inserted between the other end of the array of channel waveguides and the one end of the array of the semicircular concentric channel waveguides.

Alternatively, in the manufacturing method for the array waveguide grating according to the present invention, the Fabry-Perot resonator array may be constituted from a second array of channel waveguides which are formed on the same substrate such that lengths of these channel waveguides are successively elongated by twice the waveguide length variation ΔL and such that respective one ends thereof are connected to the other ends of the first array of channel waveguides, a first groove intersecting with both the first and second arrays of channel waveguides at a connecting portion of the first and second arrays of channel waveguides, a reflective film having a reflectance of approximately 11% and fitted in the first groove, a second groove intersecting with the second array of channel waveguides midway, and another reflective film having a reflectance of approximately 100% and fitted in the second groove.

BRIEF DESCRIPTION OF THE DRAWINGS

FIG. 1A is a plan view showing an embodiment of an array waveguide grating of the present invention;

FIG. 1B illustrates a cross-sectional view taken along the line A—A in FIG. 1A;

FIG. 1C also illustrates a cross-sectional view taken along the line A—A but depicts another embodiment of an array waveguide grating as shown in FIG. 1A;

FIG. 5A is a plan view showing still another embodiment of an array waveguide grating according to the present invention;

FIG. 5B is a structural diagram of a reflective film inserted in a first groove shown in FIG. 5A;

FIG. 5C illustrates a structure of a reflective film inserted in a second groove shown in FIG. 5A;

FIG. 6 is a plan view showing an example of conventional array waveguide gratings;

FIG. 7A is a diagram showing relationship between a converging beam field in an output-side fan-shaped slab waveguide and an output channel waveguide field having a single-peaked field distribution, in the array waveguide grating shown in FIG. 6;

FIG. 7B is a diagram showing relationship between the converging beam field in the output-side fan-shaped slab waveguide and the output channel waveguide field having a dual-peaked field distribution, in the array waveguide grating shown in FIG. 6;

FIG. 8A illustrates a diagram of wavelength-loss characteristics of an array waveguide grating, in which are formed output channel waveguides having the single-peaked field distribution shown in FIG. 7A;

FIG. 8B illustrates a diagram of wavelength-loss characteristics of an array waveguide grating, in which are formed output channel waveguides having the dual-peaked field distribution shown in FIG. 7B.

DETAILED DESCRIPTION OF THE INVENTION

Figure 2:
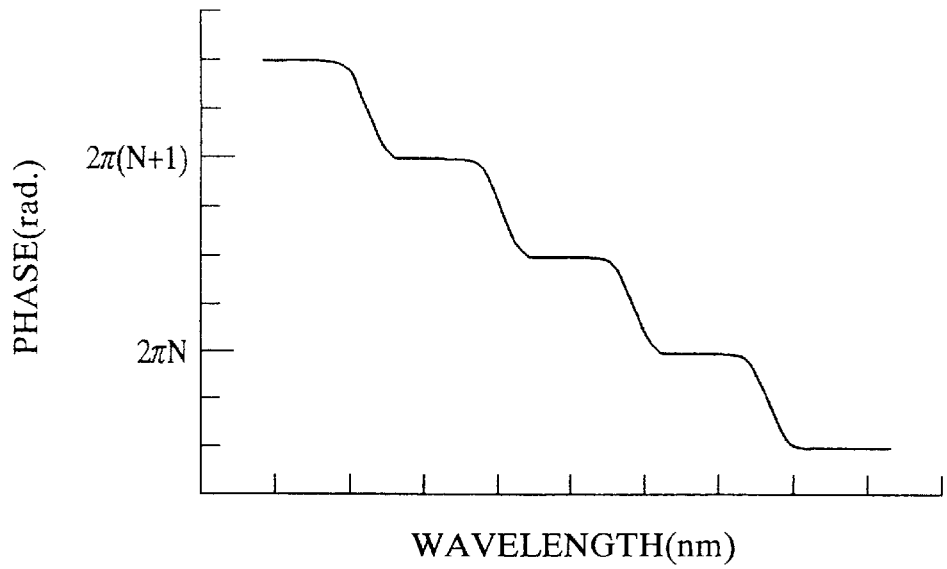
FIG. 2 is a diagram showing phase changes relative to wavelengths of light propagating each channel of the array waveguide grating shown in FIG. 1.

Embodiments of the present invention will be described in reference to the drawings.

An array waveguide grating 10 shown in FIG. 1A includes a substrate 11, an input channel waveguide 12 formed on top of the substrate 11 for receiving wavelength-multiplexed signal light at one end thereof, a plurality of output channel waveguides 13 disposed in parallel to the input channel waveguide 12 for outputting split output signal light from respective one ends thereof, a fan-shaped slab waveguide 14 connected to the other end of the input channel waveguide 12 at one end thereof and to the other ends of the output channel waveguides 13 at the same end thereof, an array of a plurality of channel waveguides 15 connected to the other end of the fan-shaped slab waveguide 14 at one end thereof such that lengths of the channel waveguides 15 are successively elongated by a desired variation ΔL, and an array of Fabry-Perot resonators 16 connected to the other end of the array of channel waveguides 15 at one end thereof such that lengths of the resonators 16 are successively elongated by twice the channel waveguide length variation ΔL.

In this array waveguide grating 10, because most of the light from the array of channel waveguides 15 is reflected by the latter stage (right side of the figure) Fabry-Perot resonator array 16 and returns, the split signal light is outputted from the output channel waveguides 13, which are positioned on the same side as the input channel waveguide 12. The Fabry-Perot resonator array 16 has a second array of channel waveguides 17, a reflective film (made of silicon) 18a having a reflectance of approximately 11%, and another reflective film (made of TiO$_2$/SiO$_2$) 18b having a reflectance of approximately 100%. The right end face of the channel waveguide array 15 and the left end face of the Fabry-Perot resonator array 16 are connected to each other by an optical adhesive 19.

The lengths of the channel waveguides in the array 17 of the Fabry-Perot resonator array 16 become successively longer by ΔP, as is the case with the array 15. The relationship between the waveguide length variation ΔL and the waveguide length variation ΔP is expressed in Equation (1):

$$\Delta P = 2 \times \Delta L \quad (1)$$

Here, ΔP is the waveguide length variation in the second channel waveguide array 17, and ΔL is the waveguide length variation in the first channel waveguide array 15.

Furthermore, both the arrays of channel waveguides 15 and 17 have a structure as shown in FIG. 1A wherein cores 20 are formed on top of a quartz substrate 11g, and these cores 20 are covered by a cladding 21, or a structure as shown in FIG. 1B wherein a buffer layer 22 is formed on top of a silicon substrate 11s, cores 20 are formed on top of the buffer layer 22, and these cores 20 are covered by a cladding 21. The buffer layer 22 is provided for suppressing the leakage of light to the silicon substrate 11s from the cores 20.

The operating principle of the array waveguide grating shown in FIG. 1A will be described below.

Signal light of various wavelengths (λ1, λ2, ... , λn) introduced to the input channel waveguide 12 is spread out by diffraction because it is not trapped in the transverse direction in the fan-shaped slab waveguide 14, and the signal light is propagated in the array of channel waveguides 15. The signal light emitted from the array of channel waveguides 15 is partially reflected by the reflective film 18 formed on the Fabry-Perot resonator array 16, and the remaining signal light is propagated along the array of channel channel waveguides 17 and reflected approximately 100% by the reflective film 18. The reflected signal light travels back and forth in the Fabry-Perot resonator array 16 numerous times and ultimately returns to the fan-shaped slab waveguide 14. "S" indicates the equiphase plane of the signal light inside the array of channel waveguides 15, which has been reflected and returned from the Fabry-Perot resonator array 16. Because the signal light progresses inside the fan-shaped slab waveguide 14 in a perpendicular direction to this equiphase plane S, it converges at the one end of the fan-shaped slab waveguide 14 and enters respective ones of the output channel waveguides 13 before it is output.

It is understood from FIG. 2 that the stepwise phase change occurs relative to the wavelength change. This signifies that the gradient of the equiphase plane changes stepwise relative to the wavelength. That is, the point of convergence of the light stays within a certain range of wavelengths, but immediately moves when the wavelength is deviated from that range.

Figure 3:
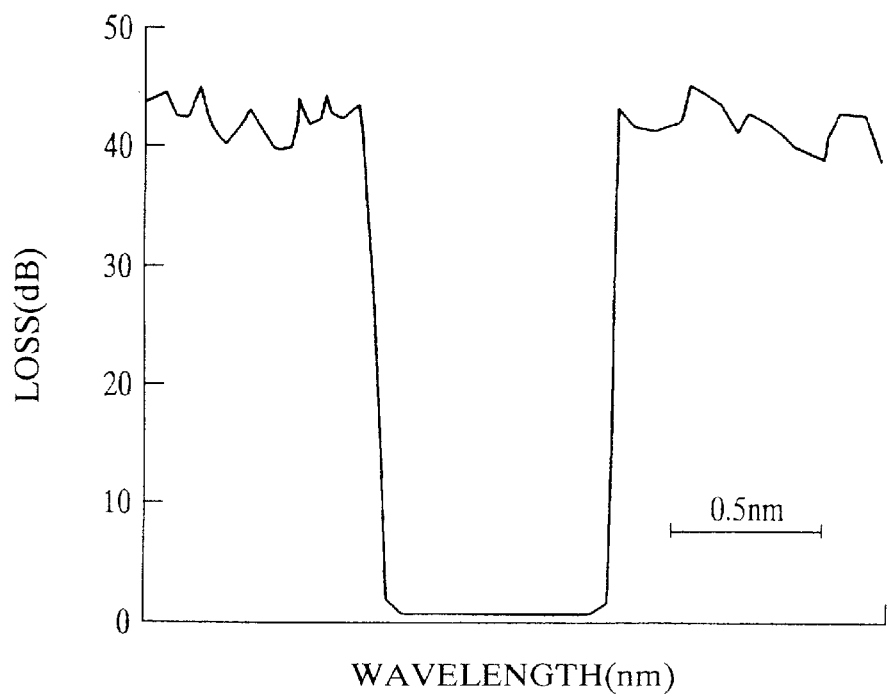
FIG. 3 is a diagram showing the wavelength-loss characteristics of the array waveguide grating shown in FIG. 1.
Figure 4:
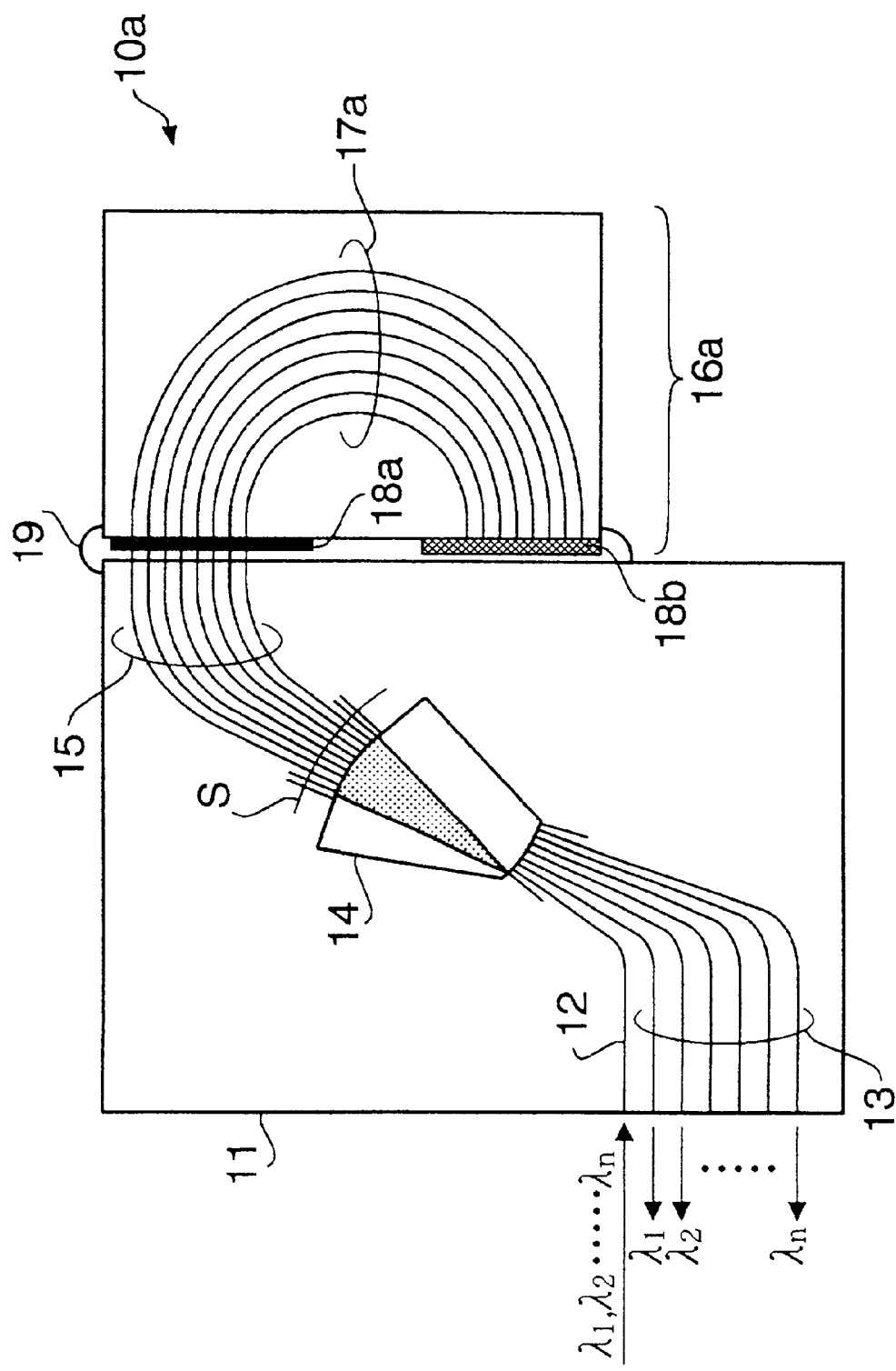
FIG. 4 is a plan view showing another embodiment of an array waveguide grating according to the present invention.
Figure 9:
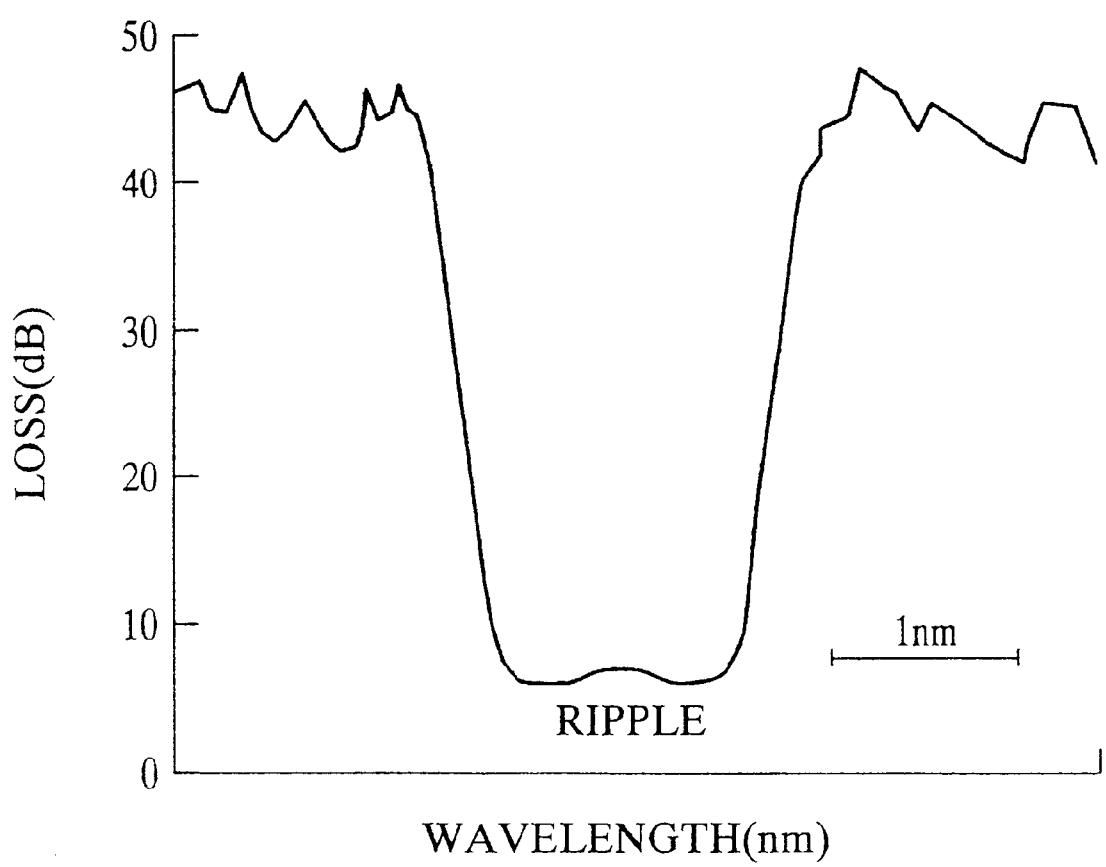
FIG. 9 illustrates an enlarged view of part of a wavelength-loss characteristics of the array waveguide grating shown in FIG. 6.

It is understood from FIG. 3 that compared to a conventional array waveguide grating, loss is not sacrificed, and a rectangular wavelength-loss characteristic without ripples is achieved in the transmission region.

Next, another embodiment of the array waveguide grating according to the present invention will be described.

The difference between this embodiment and the embodiment shown in FIG. 1 lies in that an array of channel waveguides 17a in a Fabry-Perot resonator array 16a is formed in a concentric semicircular shape.

Specifically, the Fabry-Perot resonator array 16a is constituted from the semicircular array of concentric channel waveguides 17a, respective ends of which are connected to the other ends of the array channel waveguides 15 such that the waveguides 17a become successively longer by a length of twice the waveguide length variation ΔL, a reflective film 18a having a reflectance of approximately 11% and formed between the first array of channel waveguides 15 and the second array of channel waveguides 17, and another reflective film 18b having a reflectance of approximately 100% and formed at the other end of the array of channel waveguides 17a.

By employing such a Fabry-Perot resonator array 16a, a compact-structure array waveguide grating 10a is achieved.

Next, still another embodiment of an array waveguide grating according to the present invention will be described.

The difference between this embodiment and the embodiment shown in FIG. 1 is that a Fabry-Perot resonator array 16b is integrated with an array waveguide grating 10b.

That is, this array waveguide grating 10b includes a substrate 11a, an input channel waveguide 12 formed on top of the substrate 11a for accepting wavelength-multiplexed signal light at one end thereof, an output channel waveguide 13 disposed in parallel to the input channel waveguide 12 for outputting split output signal light from one end thereof, a fan-shaped slab waveguide 14 connected to the other end of the input channel waveguide 12 at one end thereof, and to the other end of the output channel waveguide 13 at the same end thereof, an array of a plurality of channel waveguides 15, one end of which is connected to the other end of the fan-shaped slab waveguide 14 such that lengths of the channel waveguides 15 are successively elongated by a desired variation ΔL, another array of channel waveguides 17, one end of which is connected to the other end of the first channel waveguide array 15 such that lengths of the second channel waveguides 17 are successively elongated by twice the channel waveguide length variation ΔL, a first groove 23 transversely extending across the channel waveguide arrays 15 and 17 at the connecting portion of these arrays, a reflective film 18a fitted in the first groove 23 with a reflectance of approximately 11%, a second groove 24 extending transversely across the second channel waveguide array 17 midway, and a reflective film 18b inserted in the second groove 24 with a reflectance of approximately 100%.

The reflective film 18a includes a polyimide film 25 of a thickness of about 10 μm, and an Si film 26 of a submicron thickness formed on top of the polyimide film 25. The reflective film 18b is constituted from the polyimide film 25 of a thickness of about 10 μm, and a multi-layered film 27 of $TiO_2/SiO_2$ formed on top of the polyimide film 25.

The same advantages as with the array waveguide grating 10 shown in FIG. 1 are also achieved with the array waveguide grating 10b. Further, since the Fabry-Perot resonator array 16b is integrally formed in the array waveguide grating 10b, optical axis alignment and connection between the first array of channel waveguides 15 and the second array of channel waveguides 17 are not required, enabling the number of production processes to be reduced.

This application claims priority of Japanese Patent Application No. 11-350257 filed Dec. 9, 1999, the entire disclosure of which is incorporated herein by reference.

INDUSTRIAL APPLICABILITY

The present invention is applicable to an array waveguide grating and a manufacturing method therefor.

We claim:

1. An array waveguide grating comprising:
a substrate;
an input channel waveguide formed on top of the substrate for receiving wavelength-multiplexed signal light at one end thereof;
a plurality of output channel waveguides formed in parallel to the input channel waveguide for outputting split output signal light from respective one ends thereof;
a fan-shaped slab waveguide, one end of which is connected to the other end of said input channel waveguide, and to the other ends of said output channel waveguides;
an array of channel waveguides, one end of which is connected to the other end of the fan-shaped slab waveguide such that lengths of the channel waveguides are successively elongated by a desired variation ΔL; and
a Fabry-Perot resonator array connected to the other end of the array of channel waveguides at one end thereof such that lengths of the resonators are successively elongated by twice said waveguide length variation ΔL.

2. The array waveguide grating according to claim 1, wherein a reflectance of that face of said Fabry-Perot resonator array which connects with said array of channel waveguides is approximately 11%, and a reflectance of anther face opposite this connecting face is approximately 100%.

3. The array waveguide grating according to claim 1, wherein a metallic film having a reflectance of approximately 11% is coated on that face of said Fabry-Perot resonator array which connects with said array of channel waveguides, and either a metallic film or a multi-layered dielectric film of $TiO_2$ and $SiO_2$ having a reflectance of approximately 100% is coated on another face opposite the connecting face.

4. The array waveguide grating according to claim 1, wherein said reflective film is formed by vapor deposition of a metallic film of silicon, gold, or similar, on top of a thin film of polyimide.

5. The array waveguide grating according to claim 1, wherein a polyimide reflective film, on which said metallic film has been deposited by vapor deposition, is affixed by an optical resin.

6. The array waveguide grating according to claim 1, wherein said channel waveguide is formed on top of either a quartz substrate or a silicon substrate, and is made from a material having quartz glass as a principal constituent.

7. The array waveguide grating according to claim 1, wherein a principal constituent of said channel waveguide is InP.

8. An array waveguide grating comprising:
a substrate;
an input channel waveguide formed on top of the substrate for receiving wavelength-multiplexed signal light at one end thereof;
an output channel waveguide disposed in parallel to the input channel waveguide for outputting split output signal light from one end thereof;
a fan-shaped slab waveguide, one end of which is connected to the other end of said input channel waveguide, and to the other end of said output channel waveguide;
a first array of channel waveguides, respective one ends of which are connected to the other end of the fan-shaped slab waveguide such that lengths of the channel waveguides are successively elongated by a desired variation ΔL;
a second array of channel waveguides, respective one ends of which are connected to the other ends of the first array of channel waveguides such that lengths of the second channel waveguides are successively elongated by twice the waveguide length variation ΔL and such that the second channel waveguides are arranged in a semicircular and concentric shape;
a first reflective film having a reflectance of approximately 11% and formed between the first array of channel waveguides and the second array of channel waveguides; and
a second reflective film having a reflectance of approximately 100% and formed at the other end of the second array of channel waveguides.

9. The array waveguide grating according to claim 8, wherein said reflective film is formed by vapor deposition of a metallic film of silicon, gold, or similar, on top of a thin film of polyimide.

10. The array waveguide grating according to claim 8, wherein a polyimide reflective film, on which said metallic film has been deposited by vapor deposition, is affixed by an optical resin.

11. The array waveguide grating according to claim 8, wherein said channel waveguide is formed on top of either a quartz substrate or a silicon substrate, and is made from a material having quartz glass as a principal constituent.

12. The array waveguide grating according to claim 8, wherein a principal constituent of said channel waveguide is InP.

13. An array waveguide grating comprising:
a substrate;
an input channel waveguide formed on top of this substrate for receiving wavelength-multiplexed signal light at one end thereof;
an output channel waveguide disposed in parallel to the input channel waveguide for outputting split output signal light from one end thereof;
a fan-shaped slab waveguide, one end of which is connected to the other end of said input channel waveguide, and to the other end of said output channel waveguide;
a first array of channel waveguides, respective one ends of which are connected to the other end of the fan-shaped slab waveguide such that lengths of the channel waveguides are successively elongated by a desired variation ΔL;
a second array of channel waveguides, respective one ends of which are connected to the other ends of the first array of channel waveguides such that lengths of the second channel waveguides are successively elongated by twice the waveguide length variation ΔL;
a first groove formed so as to intersect with both the first and second arrays of channel waveguides at a connecting portion of the first and second arrays of channel waveguides;
a first reflective film having a reflectance of approximately 11% and inserted inside the first groove;
a second groove formed so as to intersect with the second array of channel waveguides midway; and
a second reflective film having a reflectance of approximately 100%; and inserted in the second groove.

14. The array waveguide grating according to claim 13, wherein said reflective film is formed by vapor deposition of a metallic film of silicon, gold, or similar, on top of a thin film of polyimide.

15. The array waveguide grating according to claim 13, wherein a polyimide reflective film, on which said metallic film has been deposited by vapor deposition, is affixed by an optical resin.

16. The array waveguide grating according to claim 13, wherein said channel waveguide is formed on top of either a quartz substrate or a silicon substrate, and is made from a material having quartz glass as a principal constituent.

17. The array waveguide grating according to claim 13, wherein a principal constituent of said channel waveguide is InP.

18. A method of manufacturing an array waveguide grating, comprising the steps of:
providing an input channel waveguide on top of a first substrate for receiving wavelength-multiplexed signal light at one end thereof;
providing a plurality of output channel waveguides on top of the first substrate and in parallel to the input channel waveguide for outputting split output signal light from respective one ends thereof;
providing a fan-shaped slab waveguide on top of the first substrate such that one end thereof is connected to the other end of said input channel waveguide and to the other ends of said output channel waveguides;
providing an array of channel waveguides on top of the first substrate such that lengths of the channel waveguides are successively elongated by a desired variation ΔL and such that the channel waveguides are connected to the other end of the fan-shaped slab waveguide;
providing a Fabry-Perot resonator array on top of a second substrate such that lengths of the resonators are successively elongated by twice the waveguide length variation ΔL; and
connecting the first substrate to the second substrate such that one end of the Fabry-Perot resonator array connects to the other end of said array of channel waveguides.

19. The method of manufacturing an array waveguide grating according to claim 18, wherein a reflectance of that face of said Fabry-Perot resonator array which connects with said array of channel waveguides is approximately 11%, and a reflectance of a face opposite this connecting face is approximately 100%.

20. The method of manufacturing an array waveguide grating according to claim 18, wherein a metallic film having a reflectance of approximately 11% is applied as a coating on that face of said Fabry-Perot resonator array which connects with said array of channel waveguides, and either a metallic film, or a multi-layered dielectric film of $TiO_2$ and $SiO_2$ having a reflectance of approximately 100% is applied as a coating on the face opposite the connecting face.

21. The method of manufacturing an array waveguide grating according to claim 18, wherein said reflective film is formed on a polyimide thin film by vapor deposition of a metallic film of silicon, gold, or similar.

22. The method of manufacturing an array waveguide grating according to claim 18, wherein the polyimide reflective film, on which said metallic film has been deposited by vapor deposition, is affixed by an optical resin.

23. The method of manufacturing an array waveguide grating according to claim 18, wherein said channel waveguides are formed either on a quartz substrate or on a silicon substrate, and are made from a material which has quartz glass as a principal constituent.

24. The method of manufacturing an array waveguide grating according to claim 18, wherein said channel waveguides are made using InP as a principal constituent.

25. A method of manufacturing an array waveguide grating comprising the steps of:
providing an input channel waveguide on a first substrate for receiving wavelength-multiplexed signal light at one end thereof;
providing a plurality of output channel waveguides on the first substrate and in parallel to the input channel waveguide for outputting split output signal light from one end thereof;
providing a fan-shaped slab waveguide on the first substrate such that one end thereof is connected to the other end of said input channel waveguide and the other ends of said output channel waveguides;
providing a first array of channel waveguides on the first substrate such that lengths of the channel waveguides are successively elongated by a desired variation ΔL and such that one end of the first array of channel waveguides connects to the other end of the fan-shaped slab waveguide;
providing a second array of channel waveguides on a second substrate such that lengths of the channel waveguides are successively elongated by twice the waveguide length variation ΔL and such that the second array of channel waveguides is arranged in a semicircular and concentric shape;
providing a first reflective film having a reflectance of approximately 11% at one end of said second array of channel waveguides;

providing a second reflective film having a reflectance of approximately 100% at the other end of said second array of channel waveguides; and connecting the first substrate to the second substrate such that the reflective film having a reflectance of approximately 11% is inserted between the other end of the first array of channel waveguides and one end of the second array of channel waveguides.

26. The method of manufacturing an array waveguide grating according to claim 25, wherein said reflective film is formed on a polyimide thin film by vapor deposition of a metallic film of silicon, gold, or similar.

27. The method of manufacturing an array waveguide grating according to claim 25, wherein the polyimide reflective film, on which said metallic film has been deposited by vapor deposition, is affixed by an optical resin.

28. The method of manufacturing an array waveguide grating according to claim 25, wherein said channel waveguides are formed either on a quartz substrate or on a silicon substrate, and are made from a material which has quartz glass as a principal constituent.

29. The method of manufacturing an array waveguide grating according to claim 25, wherein said channel waveguides are made using InP as a principal constituent.

30. A method of manufacturing an array waveguide grating comprising the steps of:

providing an input channel waveguide on a substrate for receiving wavelength-multiplexed signal light at one end thereof;

providing a plurality of output channel waveguides on the substrate and in parallel to the input channel waveguide for outputting split output signal light from one end thereof;

providing a fan-shaped slab waveguide on the substrate such that one end thereof is connected to the other end of said input channel waveguide and the other ends of said output channel waveguides;

providing a first array of channel waveguides on the substrate such that lengths of the channel waveguides are successively elongated by a desired variation ΔL and such that one end of the first array of channel guides connects to the other end of the fan-shaped slab waveguide;

providing a second array of channel waveguides on the substrate such that lengths of the second channel waveguides are successively elongated by twice the waveguide length variation ΔL and such that respective one ends of the second channel waveguides connect to the other ends of the first channel waveguides;

providing a first groove in the substrate to intersect with both the first and second arrays of channel waveguides at a connecting portion of the first and second arrays of channel waveguides;

inserting a first reflective film having a reflectance of approximately 11% in the first groove;

providing a second groove in the substrate to intersect the second array of channel waveguides midway; and inserting a second reflective film having a reflectance of approximately 100% in the second groove.

31. The method of manufacturing an array waveguide grating according to claim 30, wherein said reflective film is formed on a polyimide thin film by vapor deposition of a metallic film of silicon, gold, or similar.

32. The method of manufacturing an array waveguide grating according to claim 30, wherein the polyimide reflective film, on which said metallic film has been deposited by vapor deposition, is affixed by an optical resin.

33. The method of manufacturing an array waveguide grating according to claim 30, wherein said channel waveguides are formed either on a quartz substrate or on a silicon substrate, and are made from a material which has quartz glass as a principal constituent.

34. The method of manufacturing an array waveguide grating according to claim 30, wherein said channel waveguides are made using InP as a principal constituent.

* * * * *